(12) United States Patent
Urfalioglu et al.

(10) Patent No.: US 12,106,511 B2
(45) Date of Patent: Oct. 1, 2024

(54) LEARNABLE LOCALIZATION USING IMAGES

(71) Applicant: Huawei Technologies Co., Ltd., Shenzhen (CN)

(72) Inventors: Onay Urfalioglu, Munich (DE); Akhil Gurram, Munich (DE); Fahd Bouzaraa, Munich (DE)

(73) Assignee: Huawei Technologies Co., Ltd., Shenzhen (CN)

(*) Notice: Subject to any disclaimer, the term of this patent is extended or adjusted under 35 U.S.C. 154(b) by 454 days.

(21) Appl. No.: 17/473,466

(22) Filed: Sep. 13, 2021

(65) Prior Publication Data

US 2021/0407128 A1 Dec. 30, 2021

Related U.S. Application Data

(63) Continuation of application No. PCT/EP2019/056151, filed on Mar. 12, 2019.

(51) Int. Cl.
*G06K 9/00* (2022.01)
*G06T 7/73* (2017.01)

(52) U.S. Cl.
CPC ...... *G06T 7/74* (2017.01); *G06T 2207/10028* (2013.01); *G06T 2207/20081* (2013.01);
(Continued)

(58) Field of Classification Search
CPC ............. G06T 7/74; G06T 2207/10028; G06T 2207/20081; G06T 2207/20084; G06T 2207/30244
See application file for complete search history.

(56) References Cited

U.S. PATENT DOCUMENTS

2016/0174902 A1 6/2016 Georgescu et al.
2018/0165831 A1* 6/2018 Kwant ................. G01S 19/40
(Continued)

FOREIGN PATENT DOCUMENTS

CN 201980088681.2 5/2024

OTHER PUBLICATIONS

Laskar, Zakaria, et al. "Camera relocalization by computing pairwise relative poses using convolutional neural network." Proceedings of the IEEE International Conference on Computer Vision Workshops. 2017. (Year: 2017).*
(Continued)

*Primary Examiner* — Avinash Yentrapati
(74) *Attorney, Agent, or Firm* — Leydig, Voit & Mayer, Ltd.

(57) ABSTRACT

An apparatus for generating a model for pose estimation of a system obtains training data for a multiple locations. The training data includes one or more images captured by an image capturing device and the respective poses of the captured images. At least one data sample is generated from the training data for each of the captured images, where a data sample for an image is an assignment of the image and at least one other image selected from the training data to respective poses. A neural network is trained with a data set made up of the data samples to estimate a respective pose of a localization image from: the localization image; at least one additional image from the training data; and a respective pose of each of additional image.

28 Claims, 10 Drawing Sheets

(52) U.S. Cl.
CPC ............... *G06T 2207/20084* (2013.01); *G06T 2207/30244* (2013.01)

(56) References Cited

U.S. PATENT DOCUMENTS

2018/0330504 A1* 11/2018 Karlinsky ................. G06T 7/74
2022/0189060 A1*  6/2022 Türkoglu ................. G06T 7/11

OTHER PUBLICATIONS

Brachmann, Eric, et al. "Dsac-differentiable ransac for camera localization." Proceedings of the IEEE conference on computer vision and pattern recognition. 2017. (Year: 2017).*

Gurram, Akhil, et al. "Monocular depth estimation by learning from heterogeneous datasets." 2018 IEEE Intelligent Vehicles Symposium (IV). IEEE, 2018. (Year: 2018).*

Gurram et al., "Monocular Depth Estimation by Learning from Heterogeneous Datasets," arXiv:1803.08018v2 [cs.CV], total 6 pages (Sep. 12, 2018).

Mur-Artal et al., "ORB-SLAM" http://webdiis.unizar.es/~raulmur/orbslam/, total 6 pages, Jan. 2016 (Updated Oct. 2016).

Zhou et al., "Unsupervised Learning of Depth and Ego-Motion from Video," arXiv:1704.07813v2 [cs.CV], total 10 pages (Aug. 1, 2017).

Chabot et al., "Deep Manta: a Coarse-to-fine Many-Task Network for joint 2D and 3D vehicle analysis from monocular image," Arxiv.Org, Cornell University Library, 201 Olin Library Cornell University Ithaca, NY 14853, total 10 pages (Mar. 22, 2017).

Engel et al., "LSD-SLAM: Large-Scale Direct Monocular SLAM," https://vision.in.tum.de/research/vslam/lsdslam, total 11 pages (Aug. 2017).

Mur-Artal et al., "ORB-SLAM: a Versatile and Accurate Monocular SLAM System," IEEE Transactions on Robotics, arXiv:1502.00956v2 [cs.RO], total 18 pages (Sep. 18, 2015).

Xiang et al., "PoseCNN: a Convolutional Neural Network for 6D Object Pose Estimation in Cluttered Scenes," Arxiv.Org, Cornell University Library, 201 Olin Library Cornell University Ithaca, NY, 14853, total 10 pages (Nov. 1, 2017).

Zhou et al., "Unsupervised Learning of Depth and Ego-Motion from Video," https://github.com/tinghuiz/SfMLearner, total 6 pages (2021).

Engel et al., "LSD-SLAM: Large-Scale Direct Monocular SLAM," https://jakobengel.github.io/pdf/engel14eccv.pdf, total 16 pages (2014).

Dharmasiri et al., "ENG: End-to-end Neural Geometry for Robust Depth and Pose Estimation using CNNs," arXiv:1807.05705v2 [cs.CV], total 38 pages (Nov. 6, 2018).

Li et al., "UnDeepVO: Monocular Visual Odometry through Unsupervised Deep Learning," arXiv:1709.06841v2 [cs.CV] total 6 pages (Feb. 21, 2018).

Kendall et al., "PoseNet: a Convolutional Network for Real-Time 6-DOF Camera Relocalization," arXiv:1505.07427v4 [cs.CV], total 9 pages (Feb. 18, 2016).

Laskar et al., "Camera Relocalization by Computing Pairwise Relative Poses Using Convolutional Neural Network," arXiv: 1707.09733v2 [cs.CV], https://arxiv.org/pdf/1707.09733, Total 12 pages (Aug. 1, 2017).

Brachmann et al., "DSAC—Differentiable RANSAC for Camera Localization," arXiv: 1611.05705v2 [cs.CV], https://arxiv.org/pdf/1611.05705v2, Total 11 pages (Apr. 24, 2017).

* cited by examiner

LEARNABLE LOCALIZATION USING IMAGES

CROSS-REFERENCE TO RELATED APPLICATIONS

This application is a continuation of International Application No. PCT/EP2019/056151, filed on Mar. 12, 2019, the disclosure of which is hereby incorporated by reference in its entirety.

FIELD

The present disclosure relates to localization of an image in an area of interest, and, more specifically, but not exclusively, to localization of an image in an area of interest using a neural network.

BACKGROUND

Mapping and localization are increasingly important tasks in many technological fields, such as robotics, advanced driver-assistance systems (ADAS) and self-driving systems.

Typically, a defined area/route is first mapped by capturing sensor information about the defined area to create a map. The map is a collection of geometric information and other data depicting the properties of an area of interest (e.g. a route).

For localization purposes, the map is used together with current sensor information to deduce the current location of the vehicle or system within the mapped area. One of the most important types of sensor inputs comes from optical sensors, such as digital cameras.

In current solutions, features are extracted from the images based on the captured image sequence. The extracted features are processed to deduce the scene geometry and scene structure in order to create a map of the defined area, which typically contains image features with their respective three-dimensional (3D) locations, as well as pose nodes which contain information about the location and orientation of the vehicle along its trajectory during the mapping.

Localization may be conducted using the image features (e.g. point or edge features), location data and orientation data contained in the map by matching current sensor readings with the map data. These approaches are typically gradient-based optimization methods, such as simultaneous localization and mapping (SLAM).

SLAM technologies exploit point features (e.g. ORB2 SLAM) or line/edge features (e.g. LSD-SLAM) for mapping and localization. This may be an adequate solution scenes with high texture and limited moving objects. However, in scenes with limited texture and/or many or large moving objects, these approaches may lead to incorrect localization results which are difficult to compensate for.

Another problem encountered by these approaches is that the scene must appear similar in both mapping time and localization time. This requirement is not satisfied, for example, when the mapping is done in winter (e.g. snowy scene) but the localization is done in summer. The scene structure may be too different for feature points or edge features to be identified and matched. Furthermore, some applications have very specific conditions for the scenes (e.g. parking places) with repetitive patterns in the scene. Using only local information within the image (such as point and edge features) may make it difficult to have a reliable mapping and localization system.

Other methods which are used for localization are based on unsupervised deep learning for odometry using a Convolutional Neural Network (CNN). These methods do not take into account a pre-mapped sequence and are therefore not directly applicable to high accuracy localization. In one approach, ego-motion, odometry poses and corresponding depth maps are simultaneously estimated from multiple views in an unsupervised manner. Relative poses with respect to a reference pose depend solely on the corresponding images and the corresponding estimated depth maps. In a similar approach, optical flow is also estimated and used to compute relative poses. Only images and corresponding depth maps and optical flow fields are input to the CNN. In yet another approach, the focus is on estimating the scale parameter of a monocular camera trajectory.

PoseNet is a convolutional network for real-time six degrees of freedom (6-DOF) camera relocalization. PoseNet implements localization by training a CNN to estimate a 6DOF pose using a single image as input. PoseNet has large errors due to the limited amount of information about the scene being provided to the estimator/CNN. The larger the area covered for localization, the larger the localization estimation error will be.

Additional background art includes:
 [1] Raul Mur-Artal, et al., "*ORB2-SLAM: A Versatile and Accurate Monocular SLAM System*," IEEE Transactions on Robotics, Vol. 31, No. 5, October 2015, pp. 1147-1163.
 [2] Jakob Engel, et al., "*LSD-SLAM: Large-Scale Direct Monocular SLAM*," www(dot)vision(dot)in(dot)tum (dot)de/research/vslam/lsdslam.
 [3] Tinghui Zhou, et al., "*Unsupervised Learning of Depth and Ego-Motion from Video,*" 2017 IEEE Conference on Computer Vision and Pattern Recognition (CVPR).
 [4] Thanuja Dharmasiri, et al., "*ENG: End-to-end Neural Geometry for Robust Depth and Pose Estimation using CNNs*," www(dot)arxiv(dot)org/abs/1807(dot)05705.
 [5] Ruihao Li, et al., "*UnDeepVO: Monocular Visual Odometry through Unsupervised Deep Learning*," www(dot)arxiv(dot)org/abs/1709(dot)06841.
 [6] Alex Kendall, et al., "*PoseNet: A Convolutional Network for Real-Time 6-DOF Camera Relocalization*," www(dot)arxiv(dot)org/pdf/1505(dot)07427 (dot)pdf.

SUMMARY

Embodiments of the present disclosure provide an apparatus, a system, a computer program product, and a method for robust and accurate localization using deep learning to exploit information provided by images which were captured during the mapping of an area of interest.

Aspects of the present disclosure include:
 a) Training a neural network to estimate pose changes between images; and
 b) Applying the trained neural network to estimate the pose of a localization image.

In order to exploit more image information during localization, the images obtained during the mapping process (or a selected subset of key frames) are stored. Optionally, a necessary amount of content and/or scene overlap is maintained between each consecutive key-frame.

During training, a neural network (such as a deep neural network) is trained to predict pose differences, based on a data set which includes multiple data samples. Each data sample assigns respective poses to a subset of the images that were captured when the area of interest was mapped. Optionally the poses are expressed relative to the pose of a reference image as described below.

During the localization phase, the trained neural network estimates the pose of the localization image, based on the localization image itself and stored images captured during mapping and their respective poses.

The output of the neural network is an estimate of the pose of the localization image. When the pose estimate is relative to a reference image, a transformation may be applied to convert the pose estimate to a map-relative pose.

The types of neural networks which may be trained and used for localization include but are not limited to:

1) A deep neural network (DNN);
2) A convolutional neural network (CNN);
3) A recurrent neural network (RNN); and
4) A Long short-term memory (LSTM) neural network.

Benefits of the present disclosure include the following:

1) The data set for training the neural network may be built easily, for example using Differential Global Positioning Systems (DGPS) and stereo image recording from multiple loops over same route.

2) Once the neural network is trained, only one loop is required for mapping.

3) Multi-layer neural network may be used for relative pose estimation, thereby improving robustness. A neural network is able to use not only point, line and simple edge features, but also more generic and higher order features from the image content. The image content may be determined from the data by the training process.

4) Improved sensitivity to difficult lighting conditions, which may be trained for explicitly.

5) Improved results in less structured environments, which may not provide point, line and simple edge features but may be trained for explicitly.

6) No tracking loss.

7) The neural network may be explicitly trained to handle dynamic objects by including them in the training data. When the training data is large enough, the neural network learns to discard the dynamic objects.

8) The neural network may be trained for cases where the mapping is not perfect by artificially adding noise to the mapping poses while keeping proper ground truth localization poses in the data set.

9) The trained neural network may be used in a wide variety of environments (e.g., cities, urban scenarios, highways, etc.).

10) If there is a significant change in an area, it is only necessary to remap the mapping such that the neural network detects that the localization image is similar to the map image. It is not necessary to retrain the neural network.

According to a first aspect of the present disclosure, an apparatus for generating a model for pose estimation of a system includes processor circuitry. The processor circuitry obtains training data for a multiple locations. The training data includes one or more images captured by an image capturing device and the respective poses of the captured images, where a respective pose of an image is the respective location and orientation of the image capturing device during capture of the image. At least one data sample is generated by the processing circuitry from the training data for each of the captured images, where a data sample for an image is an assignment of the image and at least one other image selected from the training data to respective poses. The processor circuitry trains a neural network with a data set made up of the data samples to estimate a respective pose of a localization image from:

a) The localization image;
b) At least one additional image from the training data; and
c) A respective pose of each of additional image.

According to a second aspect of the present disclosure, a method for generating a neural network for pose estimation of a system includes obtaining training data for a multiple locations. The training data includes one or more images captured by an image capturing device and the respective poses of the captured images, where a respective pose of an image is the respective location and orientation of the image capturing device during capture of the image. The method further includes generating at least one data sample for each of the captured images from the training data and training the neural network with a data set made up of the data samples, where a data sample for an image is an assignment of the image and at least one other image selected from the training data to respective poses. The neural network is trained to estimate a respective pose of a localization image from:

a) The localization image;
b) At least one additional image from the training data; and
c) A respective pose of each of additional image.

The data set may be built automatically and may include images obtained under many conditions, making the trained neural network robust to changes in lighting conditions, to the presence of dynamic objects in the images and to other changes. Additionally, it is possible to use supervised learning to train the neural network, yielding increased performance relative to methods which use unsupervised learning.

With reference to the first and/or second aspects, in a possible implementation generating at least one data sample includes:

Selecting at least one reference image from the training data;

Selecting at least one proximate image having a pose proximate to a pose of the at least one reference image from the training data; and Assigning the at least one reference image and the at least one proximate image to respective poses of each proximate image relative to each reference image.

Basing the data sample on a single reference image simplifies the construction of the data sample as well as the processing of the data sample during neural network training.

With reference to the first and/or second aspects, in a possible implementation, for at least one of the data samples, assigning an image and at least one other image selected from the training data to respective poses includes:

Selecting a multiple reference images selected from the training data;

Selecting at least one proximate image from the training data based on proximity to the reference images; and Designating respective poses of each proximate image relative to each reference image.

Using multiple reference images increases the amount of information in the data sample and thus the amount of information provided to the neural network.

With reference to the first and/or second aspects, in a possible implementation respective poses of the at least one proximate image are within a specified distance from a pose of at least one of the reference images. Thus the proximate image(s) may be easily selected, as distant images are automatically eliminated from consideration.

With reference to the first and/or second aspects, in a possible implementation an error is introduced into the training data by changing at least one pose in the data samples prior to the training. Deliberately introducing errors into the training data increases the robustness of the trained neural network changes in the area of interest after the mapping is performed.

With reference to the first and/or second aspects, in a possible implementation errors in estimation of the poses are tracked during the training, and to respective confidence values are calculated for poses estimated by the neural network based on the tracked errors. The confidence values increase the amount of information available for training the neural network, thereby improving the training process.

With reference to the first and/or second aspects, in a possible implementation at least one of the data samples further includes a semantic segmentation computed for at least one image mapped in the data set.

With reference to the first and/or second aspects, in a possible implementation at least one of the data samples further includes a depth map computed for at least one image mapped in the data set.

Semantic segmentation and/or depth map information which is included in the data sample serves as additional input to the neural network, thereby relaxing the training data requirements and improving neural network generalization.

With reference to the first and/or second aspects, in a possible implementation the neural network is a deep neural network (DNN). DNNs are able to model complex and non-linear relationships as required for image analysis and recognition, which is beneficial for deriving pose information using actual images as input to the neural network.

According to a third aspect of the present disclosure, an apparatus for image-based localization of a system in an area of interest includes a memory and processor circuitry. The memory is configured to store images captured by an image capturing device of the system at a multiple locations in an area of interest, and respective poses of the image capturing device associated with the stored images at each of the locations, wherein a pose of an image comprises a location and orientation of the capturing device associated with a respective image. The processor circuitry is configured to:
  Obtain a localization image captured by an image capturing device;
  Retrieve from the memory a subset of the stored images and respective poses;
  Provide to a trained neural network:
    a) The localization image;
    b) The subset of images; and
    c) The respective poses of the retrieved images; and
  Obtain from the trained neural network at least one estimated pose for the localization image.

According to a fourth aspect of the present disclosure, a method for image-based localization of a system in an area of interest includes:
  Obtaining a localization image captured by a capturing device of the system;
  Providing to a trained neural network:
    a) The localization image;
    b) A subset of images selected from a multiple images captured during a mapping of the area of interest; and
    c) The respective poses of the subset of images; and
  Obtaining from the trained neural network at least one estimate of a pose of the localization image.

The neural network is able to provide a highly accurate pose estimate based on the large amount of information available by using the map images themselves as part of the data input to the neural network during the localization process.

With reference to the third and fourth aspects, in a possible implementation an approximate location of the image capturing device during the capturing of the localization image is determined and the subset of stored images is selected based on the approximate location. Using close images may assist with detecting errors in the pose estimates. Since the pose difference between an image in the subset and the localization image should be small, large differences between the predicted pose and the known poses of the images may indicate an error.

With reference to the third and fourth aspects, in a possible implementation the neural network outputs a single estimated pose relative to a pose of a single reference image selected from the retrieved images. Outputting a single pose estimate per localization image minimizes the processing required after the neural network.

With reference to the third and fourth aspects, in a possible implementation the neural network outputs multiple estimated poses, each of the estimated poses being relative to a pose of a different reference image selected from the retrieved images. A final estimated pose is calculated from the multiple estimated poses. Calculating the final estimated pose from multiple intermediate estimates increases the amount of information utilized to obtain the final pose estimate, thereby improving its accuracy.

With reference to the third and fourth aspects, in a possible implementation an estimation accuracy measure is calculated by comparing a pose change between multiple estimated poses for the localization image to at least one pose change between reference images used for calculating the multiple estimated poses. The estimation accuracy measure ensures that inaccurate pose estimates are identified and are not relied on by a user or external system.

With reference to the third and fourth aspects, in a possible implementation the trained neural network is a deep neural network (DNN). DNNs are able to model complex and non-linear relationships as required for image analysis and recognition, which is beneficial for deriving pose information using actual images as input to the neural network.

With reference to the third and fourth aspects, in a possible implementation the trained neural network is further provided with a semantic segmentation computed for at least one of the images provided to the trained neural network.

With reference to the third and fourth aspects, in a possible implementation wherein the trained neural network is further provided with a depth map computed for at least one of the images provided to the trained neural network.

The semantic segmentation and/or depth map information serves as additional input to the neural network, thereby improving the accuracy of the pose estimate.

Unless otherwise defined, all technical and/or scientific terms used herein have the same meaning as commonly understood by one of ordinary skill in the art to which the present disclosure pertains. Although methods and materials similar or equivalent to those described herein can be used in the practice or testing of embodiments of the present disclosure, exemplary methods and/or materials are described below. In case of conflict, the present disclosure, including definitions, will control. In addition, the materials, methods, and examples are illustrative only and are not intended to be necessarily limiting.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

BRIEF DESCRIPTION OF THE DRAWINGS

Some embodiments of the present disclosure are herein described, by way of example only, with reference to the accompanying drawings. With specific reference now to the drawings in detail, it is stressed that the particulars shown are by way of example and for purposes of illustrative discussion of embodiments of the present disclosure. In this regard, the description taken with the drawings makes apparent to those skilled in the art how embodiments of the present disclosure may be practiced.

In the drawings.

DETAILED DESCRIPTION

Figure 1:
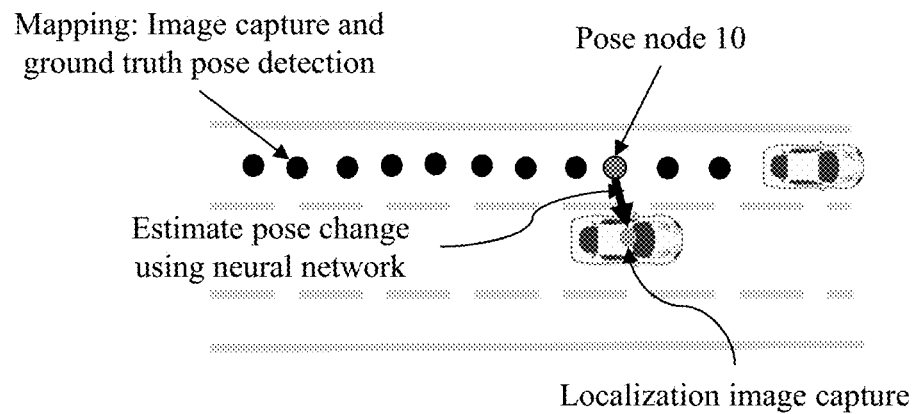
FIG. 1 illustrates mapping and localization using a neural network, according to an exemplary embodiment of the present disclosure.

The present disclosure, in some embodiments thereof, relates to localization of an image in an area of interest, and, more specifically, but not exclusively, to localization of an image in an area of interest using a neural network.

Embodiments of the disclosure presented herein take a hybrid approach to localization using a trained neural network. Localization is performed by the neural network not only based on data extracted from the images captured during the mapping but also using the images themselves. The images captured during the mapping process are used to train the neural network and also as input to the trained neural network during localization.

Using stored map images as input to the neural network during localization increases the amount of image information available to the neural network, resulting in highly accurate and reliable localization estimates.

As used herein, the term "pose of an image" means the location and orientation of the image capturing device when it captured the image (i.e. at the time of image capture). The pose may be expressed as three location coordinates and three angular coordinates, which indicate the location and orientation associated with an image. It will be appreciated that the pose is relative to a coordinate system and that a pose may be transformed from one coordinate system to another by a linear and/or angular transformation.

As used herein, the term "localization image" means an image whose pose is being estimated by the neural network.

As used herein the term "map-relative pose" means a pose expressed in the map coordinate system (also denoted a ground truth pose).

As used herein the term "pose relative to a reference image" means a pose expressed in the coordinate system of a reference image.

Before explaining at least one embodiment of the disclosure in detail, it is to be understood that the present disclosure is not necessarily limited in its application to the details of construction and the arrangement of the components and/or methods set forth in the following description and/or illustrated in the drawings and/or the examples. The present disclosure is capable of other embodiments or of being practiced or carried out in various ways.

The present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more exemplary examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD- ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Reference is now made to FIG. 1, which illustrates mapping and localization using a neural network, according to an exemplary embodiment of the disclosure.

During mapping, a sequence of images is captured at multiple locations in an area of interest (in this case the route of a vehicle). The map includes the captured images and their map-relative poses (i.e. ground truth poses).

Some exemplary embodiments are described herein in a non-limiting manner for a map represented as a pose graph (denoted the mapping sequence). The pose graph includes interconnected pose nodes which define one or multiple chains of poses (e.g. follow one or multiple trajectories of a vehicle). It is to be understood that corresponding embodiments may be implemented for other representations of the map used to train the neural network and/or of the image and pose information used as input to the neural network during localization.

Optionally, the neural network is trained to estimate the pose of the localization image relative to the coordinate system of a selected reference node 10. The ground truth pose estimate for the localization image is calculated from the ground-truth pose of reference node 10 (which is known from the mapping) and the estimated pose output by the neural network.

As used herein the terms "pose node" and "node" mean an element having an associated image and pose, and information about connections to other pose nodes.

A pose node may include additional information, including but not limited to:
1) The date and time the image was captured;
2) Settings of the image capturing device during image capture; and
3) Weather conditions during image capture.

Optionally, the neural network is further trained to detect when there is a high probability that the localization image is from a location outside the mapped area of interest, in which case it may not be possible to perform accurate localization based on the localization image.

A. Mapping

During the mapping process, images are captured by an image capturing device over an area of interest (e.g. a route). A mapping sequence is created from the captured images and their respective poses. In one example, a vehicle carrying an image capturing device and location and orientation sensors travels along a route. The image capturing device captures images at a fixed rate and the pose at the time each image is captured.

As used herein, the term "image capturing device" means any type of device capable of capturing an image, without limitation as to how the image is captured or to the hardware or type of the image capturing device. Examples of an image capturing device include, but are not limited to, a camera and an image sensor.

One or more images may be captured at each location, possibly at different times and/or at different orientations (for example stereo images). The types of images which may be captured, include but are not limited to RGB images, chrominance-luminance images and infra-red images.

Optionally, the map is updated during the localization stage in order to maintain accuracy.

B. Training a Neural Network for Pose Estimation

Figure 2:
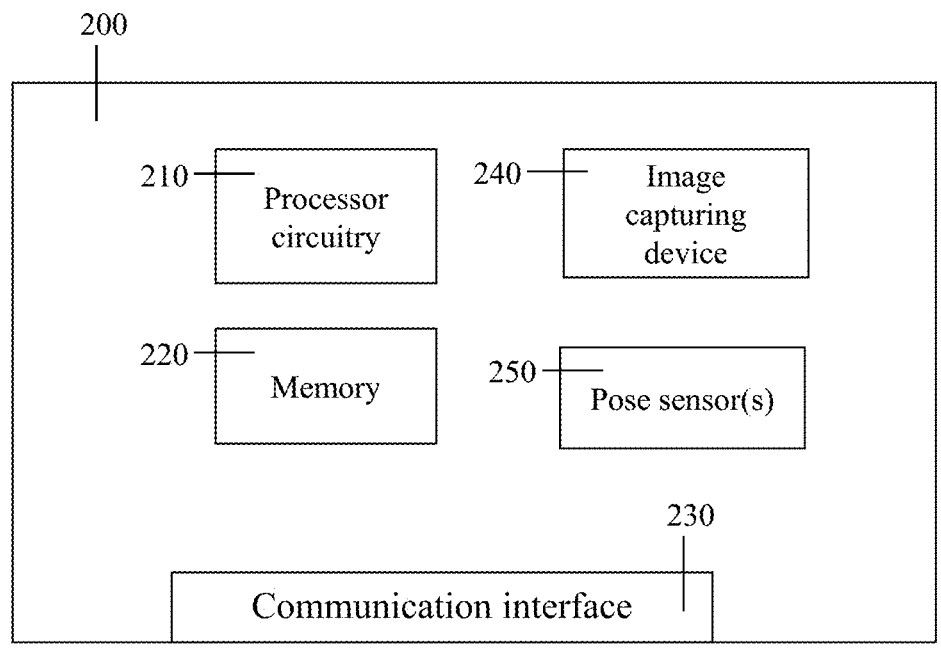
FIG. 2 is a simplified block diagram of an apparatus for generating a model for pose estimation of a system, according to embodiments of the present disclosure.

Reference is now made to FIG. 2, which is a simplified block diagram of an apparatus for generating a model for pose estimation of a system, according to embodiments of the disclosure. Apparatus 200 includes processor circuitry 210. Embodiments of apparatus 200 may further include one or more of:
a) Memory 220; and
b) Communication interface 230.

Processor circuitry 210 performs processing operations for training the neural network.

Apparatus 200 obtains training data which was gathered at multiple locations during the mapping process. The training data includes least one image captured at each location and respective poses of the captured images.

Optionally, the apparatus includes at least one memory 220, and some or all of the captured images and their respective poses are stored in memory 220 for use as training data. Alternately or additionally, the apparatus includes communication interface 230, and some or all of the training data is obtained from an external element (e.g. an external memory, server, over a network, etc.).

Apparatus 200 generates data samples from the training data. Each data sample assigns images selected from the training data to their respective poses. Examples of generating data samples are illustrated in FIGS. 4-9 and are described in more detail below.

The data samples are combined into a data set which is used to train the neural network. The neural network is trained to identify the pose of a localization image from:

a) The localization image;
b) One or more additional images which were part of the training data; and
c) Respective poses of each of the additional image(s).

Figure 3:
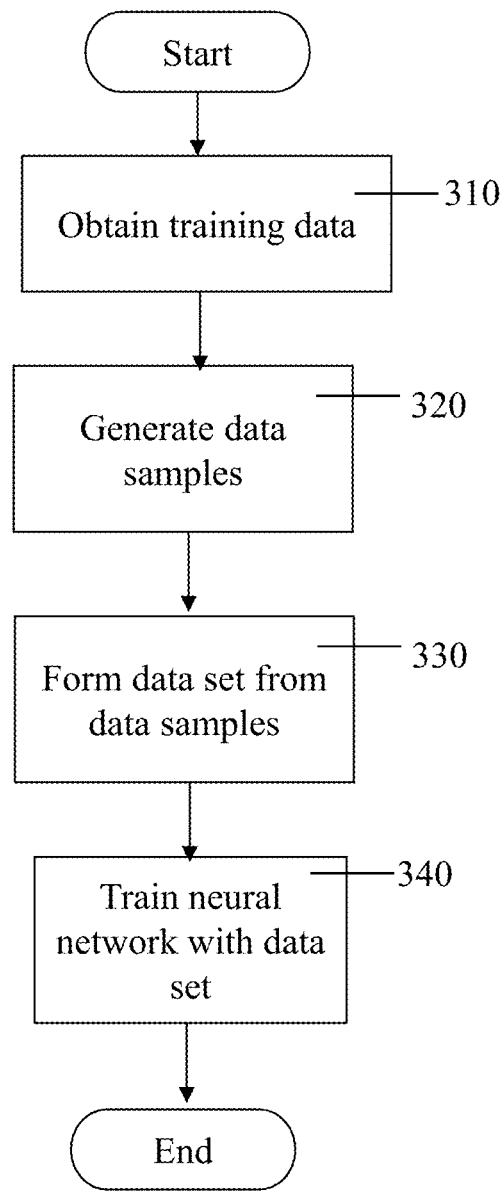
FIG. 3 is a simplified flowchart of a method for generating a neural network for pose estimation of a system, according to embodiments of the present disclosure.

Reference is now made to FIG. 3, which is a simplified flowchart of a method for generating a neural network for pose estimation of a system, according to embodiments of the disclosure.

In 310, the training data is obtained.

In 320, at least one data sample is generated for each of the images. A data sample for an image is an assignment of the image and at least one other image selected from the training data to respective poses.

In 330, a data set for training a neural network is formed from multiple data samples.

In 340, the neural network is trained with the data set to estimate a pose of a localization image from:
a) The localization image;
b) One or more additional images from the training data; and
c) Respective poses of each of the additional image(s).

C. Generating a Data Sample

In some embodiments of the disclosure, a data sample is generated by selecting at least one reference image from the training data. At least one proximate image is also selected from the training data.

The proximate image(s) have respective pose(s) which are proximate to the pose of at least one reference image. In some embodiments, the proximate images are images that were captured at a close distance from the location at which a reference image was captured. The proximate nodes are not necessarily consecutive within the mapping sequence nor are they necessarily the closest nodes to the reference node(s). Optionally, the proximate nodes are located within a specified distance from one or more reference nodes.

The data sample is created by assigning respective poses to each proximate image relative to each reference image.

Optionally, the data sample further includes semantic segmentation (SS) information for at least one of its images. The semantic segmentation information classifies pixels in the image as to the type of object it is depicting (e.g., pixel of a car, pixel of a vegetation, building, sky, road . . . ).

Optionally, the data sample further includes depth map information for at least one of its images. The depth map (DM) provides respective depth information for a scene point in the image.

The data samples which form the data set used for training are not necessarily of the same structure or type. Possible differences between data samples include but are not limited to:
1) The total number of images;
2) The number of reference images;
3) The number of proximate images;
4) Whether the data sample includes semantic segmentation and/or depth map information; and
5) Whether errors have been introduced to the mapping poses (to simulate erroneous mapping).

One benefit of creating the training data set according to embodiments of the disclosure is that there is no need for manual labelling. This allows for fully-automatic training data set generation.

In the non-limiting embodiments described below, the pose node of a reference image is denoted a reference node and the pose node of a proximate image is denoted a proximate node.

C.1 Data Sample with Single Reference Node and Multiple Proximate Nodes

Optionally, at least one data sample has a single reference node and multiple proximate nodes. In the non-limiting examples illustrated in FIGS. 4 and 6, the reference nodes are shown as part of the first mapping loop and the proximate nodes are shown as part of the second mapping loop. It is noted that the reference and proximate nodes are not necessarily selected from different mapping loops but rather may be in any order or combination. Furthermore, the mapping sequence is not necessarily defined as two mapping loops.

Figure 4:
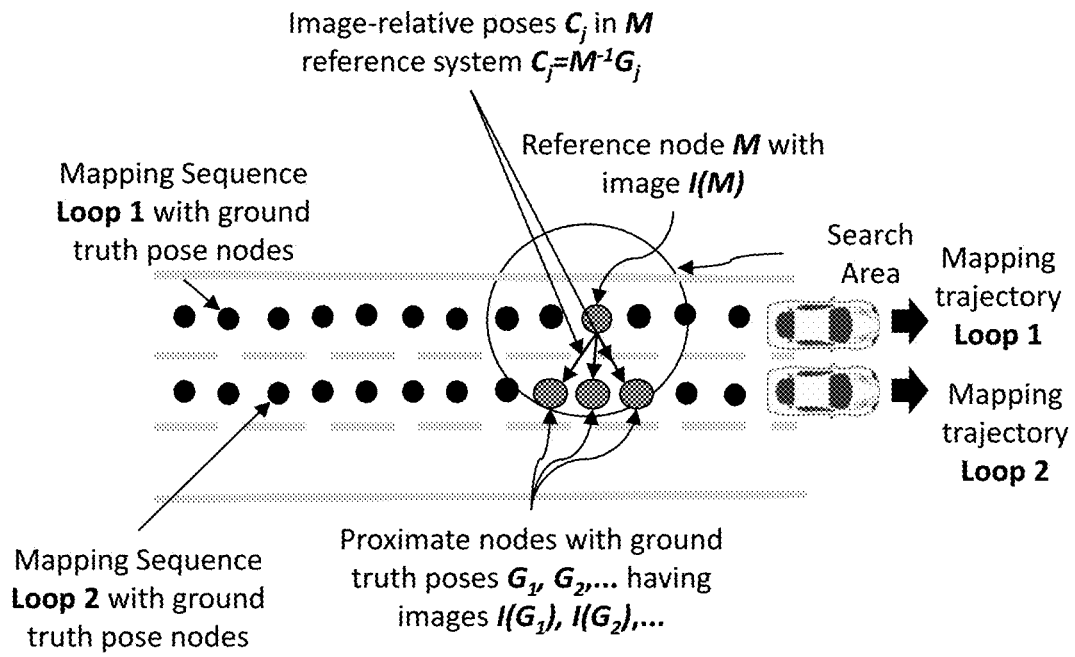
FIG. 4 illustrates the creation of a data sample having a single reference node and multiple proximate nodes, according to embodiments of the present disclosure.

Reference is now made to FIG. 4 which illustrates the creation of a data sample having a single reference node M and proximate nodes (G1, G2 . . . ), according to embodiments of the disclosure. Reference node M is selected as the origin coordinate system.

In a first example the data sample is the assignment:

$$(I(M), I(G1), I(G2), \ldots ) \rightarrow (C1, C2, \ldots ),$$

where I(X) means the image at the pose node X and C1, C2, . . . are the image-relative poses expressed with respect to node M.

In a second example semantic segmentation data and/or depth mapping data is available for one or more nodes and the data sample is:

$$(I(M), I(G1), I(G2), \ldots , [SS(M), SS(G_1), \ldots , DM(M)]) \rightarrow (C1, C2, \ldots ),$$

where SS(X) means the semantic segmentation information for the image at pose node X and DM(X) means the depth map information for the image at pose node X.

Figure 5:
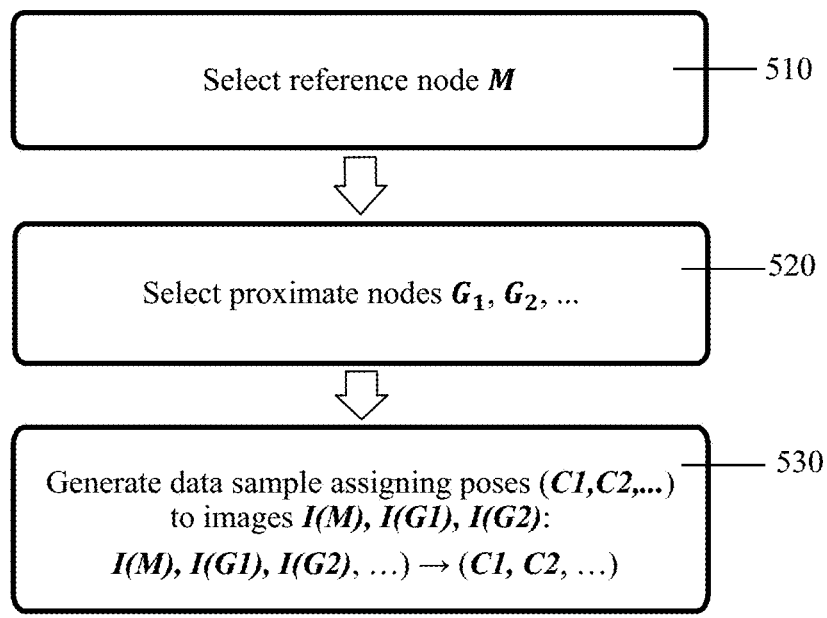
FIG. 5 is a simplified flowchart of a method for creating a data sample having a single reference node and multiple proximate nodes, according to embodiments of the present disclosure.

Reference is now made to FIG. 5, which is a simplified flowchart of a method for creating a data sample having a single reference node and multiple proximate nodes, according to embodiments of the disclosure.

In 510, reference node M is selected.

In 520, proximate nodes G1, G2 . . . are selected.

In 530, a data sample is built for M, G1, G2 . . . by assigning the respective poses. In the example of FIG. 5, the data sample does not include SS and DM information. Other types of data samples may be built for the same images with SS and/or DM information and/or additional information as described below.

C.2 Data Sample with Multiple Reference Nodes and Multiple Proximate Nodes

Optionally, at least one data sample has multiple reference nodes (denoted $M_{k+n}$) and multiple proximate nodes (denoted $G_j$). Respective poses are designated for each proximate image relative to each of the reference images. By including the additional information provided by the multiple reference nodes, the available information is better exploited when training the neural network.

Optionally, the pose information of all the reference nodes $M_{k+n}$ is included as information in the data sample. This provides the benefit of wider coverage of the scene information provided by the proximate nodes.

Figure 6:
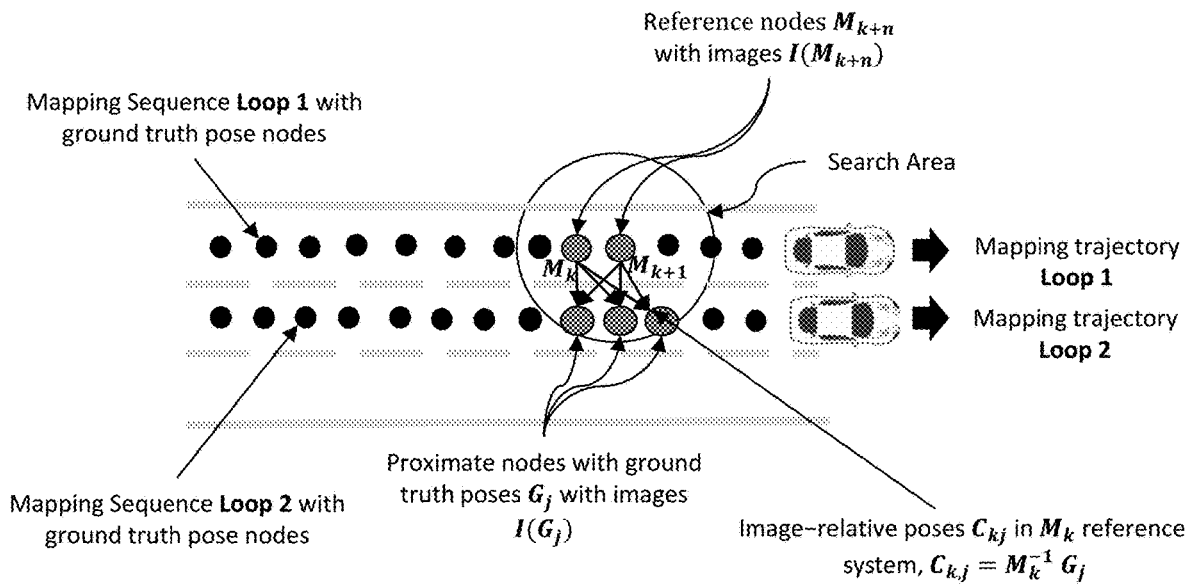
FIG. 6 illustrates the creation of a data sample having multiple reference nodes and multiple proximate nodes, according to embodiments of the present disclosure.

Reference is now made to FIG. 6 which illustrates the creation of a data sample having multiple reference nodes, $M_{k+n}$, and multiple proximate nodes, $G_j$, according to embodiments of the disclosure.

In a first example, the data sample is the assignment:

$$I(M_{k+n}), I(G_j), M'_{k+n}) \rightarrow (C_{k,j}),$$

where $I(M_{k+n})$ means the images at reference nodes $X_k \ldots X_{k+n}$, $I(G_j)$ means the images at proximate nodes $G_j$. M'k+n are the poses of the reference nodes relative to a reference node which is selected as the origin coordinate system (in this example $M_k$), where:

$$M'_{k+n} = M_k^{-1} M_{k+n},$$

and $C_{k,j}$ are the poses of each proximate node relative to each reference node as expressed in the origin coordinate system.

In a second example semantic segmentation data and/or depth mapping data is available for one or more nodes and the data sample is:

$$(I(M_{k+n}), I(G_j), M'_{k+n}, \ldots , [SS(M_{k+n}), SS(G_j), \ldots , DM(M_{k+n})]) \rightarrow (C_{k,j}).$$

Figure 7:
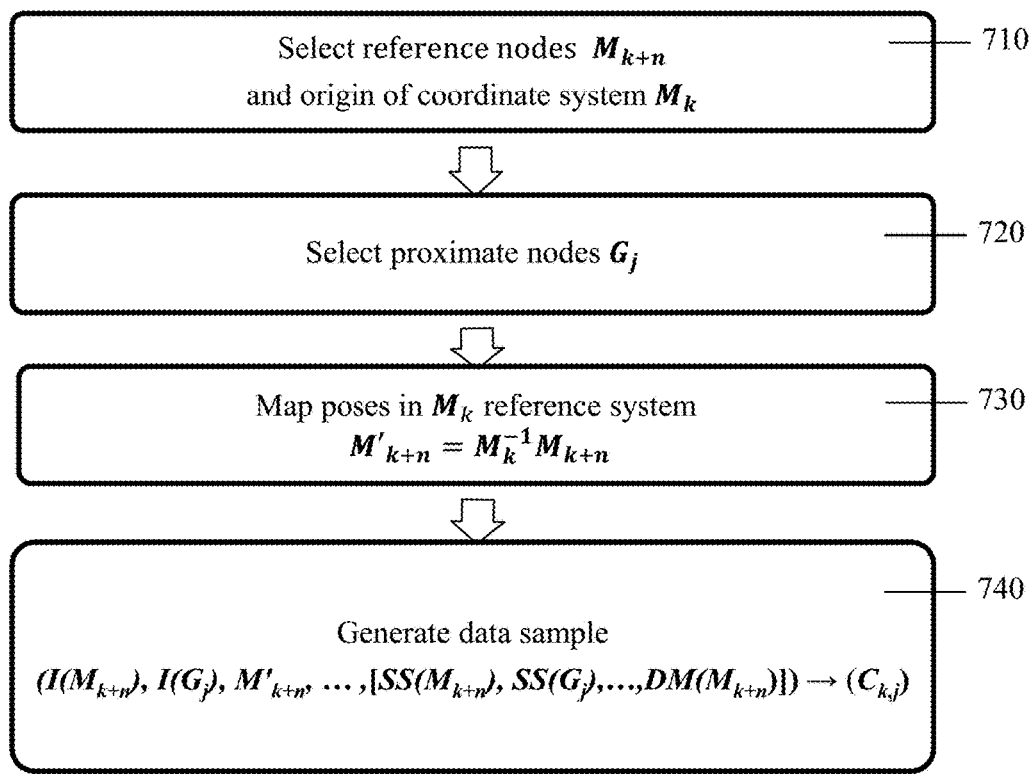
FIG. 7 is a simplified flowchart of a method for creating a data sample having multiple reference nodes and multiple proximate nodes, according to embodiments of the present disclosure.

Reference is now made to FIG. 7, which is a simplified flowchart of a method for creating a data sample having multiple reference nodes and multiple proximate nodes, according to embodiments of the disclosure.

In 710, multiple reference nodes, $M_{k+n}$, are selected and one of the reference nodes, $M_k$, is selected as the origin of the coordinate system.

In 720, proximate nodes $G_j$ are selected.

In 730, the poses of the reference nodes are transformed to the $M_k$ coordinate system.

In 740, a data sample is built for $M_{k+n}$ and $G_j$ by assigning the respective poses $C_{k,j}$.

In the example of FIG. 7, the data sample includes SS and DM information, and the data sample is $(I(M_{k+n}), I(G_j), M'_{k+n}, \ldots , [SS(M_{k+n}), SS(G_j), \ldots , DM(M_{k+n})]) \rightarrow (C_{k,j})$. Other data samples may be built for the same images without SS and/or DM information.

C.3 Confidence Values

Optionally, pose estimation errors are tracked while the neural network is being trained. The errors are used to calculate confidence values, w, for pose estimates output by the neural network. Further optionally, the confidence values are used as additional input for training the neural network.

In a first example, the data sample is generated for a single reference node and multiple proximate nodes with no SS or DM information (as in FIGS. 2-3). The data sample may be expressed as:

$$(I(M), I(G1), I(G2), \ldots ) \rightarrow (C1, C2, \ldots w_1, w_2 \ldots ),$$

where $w_x$ is the confidence value for pose CX.

Figure 8:
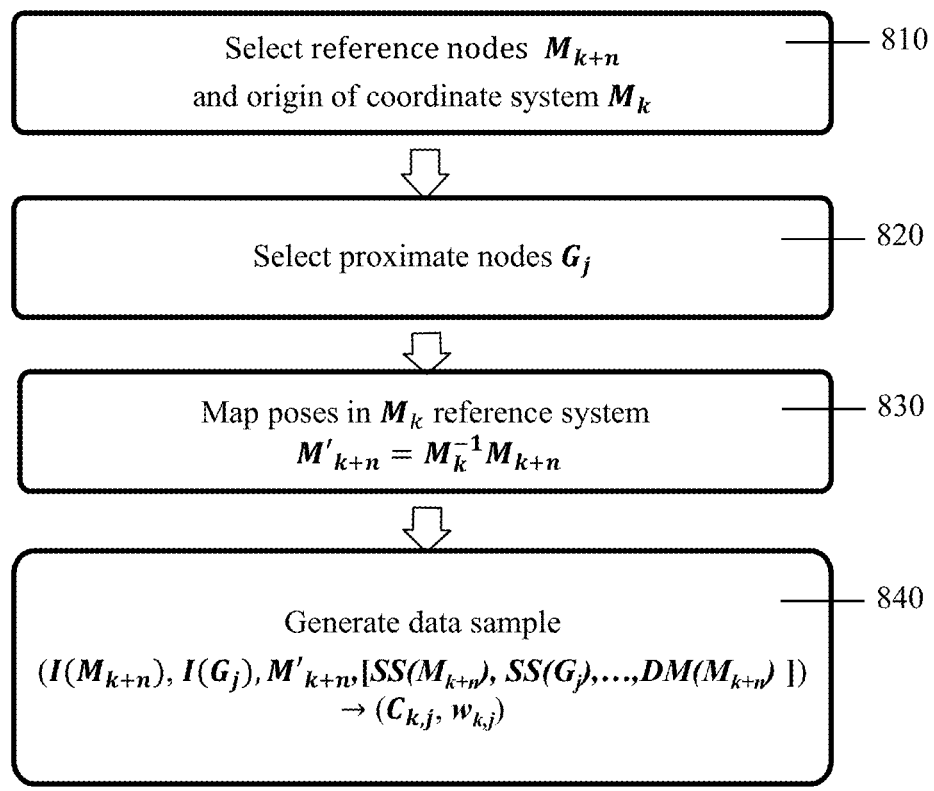
FIG. 8 is a simplified flowchart of a method for creating a data sample with confidence values, according to an exemplary embodiment of the present disclosure.

Reference is now made to FIG. 8, which is a simplified flowchart of a method for creating a data sample with confidence values, according to an exemplary embodiment of the disclosure. In the embodiment of FIG. 8, the data sample is for multiple reference nodes and multiple proximate nodes with SS and DM information, according to embodiments of the disclosure.

In 810, multiple reference nodes, $M_{k+n}$, are selected and one of the reference nodes, $M_k$, is selected as the origin of the coordinate system.

In 820, proximate nodes $G_j$ are selected.

In 830, the poses of the reference nodes are transformed to the $M_k$ coordinate system.

In 840, a data sample is built for $M_{k+n}$ and $G_j$ by assigning the respective poses $C_{k,j}$. In the example of FIG. 8, the data sample includes SS and DM information, and the data sample is $(I(M_{k+n}), I(G_j), M'_{k+n}, \ldots , [SS(M_{k+n}), SS(G_j), \ldots , DM(M_{k+n})]) \rightarrow (C_{kj}, w_{k,j})$. Other data samples may be built for the same images without SS and/or DM information.

C.4 Simulating an Erroneous Mapping

Optionally, one or more errors are introduced into the training data by changing at least one pose in at least one data sample. For example, minor angular and/or location may be added to the correct pose parameters. Adding error(s) to a pose simulates mapping inaccuracies, so that the neural network may be trained to maintain high accuracy even when the mapping used during localization is not accurate. Note that the accurate poses $C_{kj}$ are available during training, so that the neural network may be trained to estimate the poses correctly.

Figure 9:
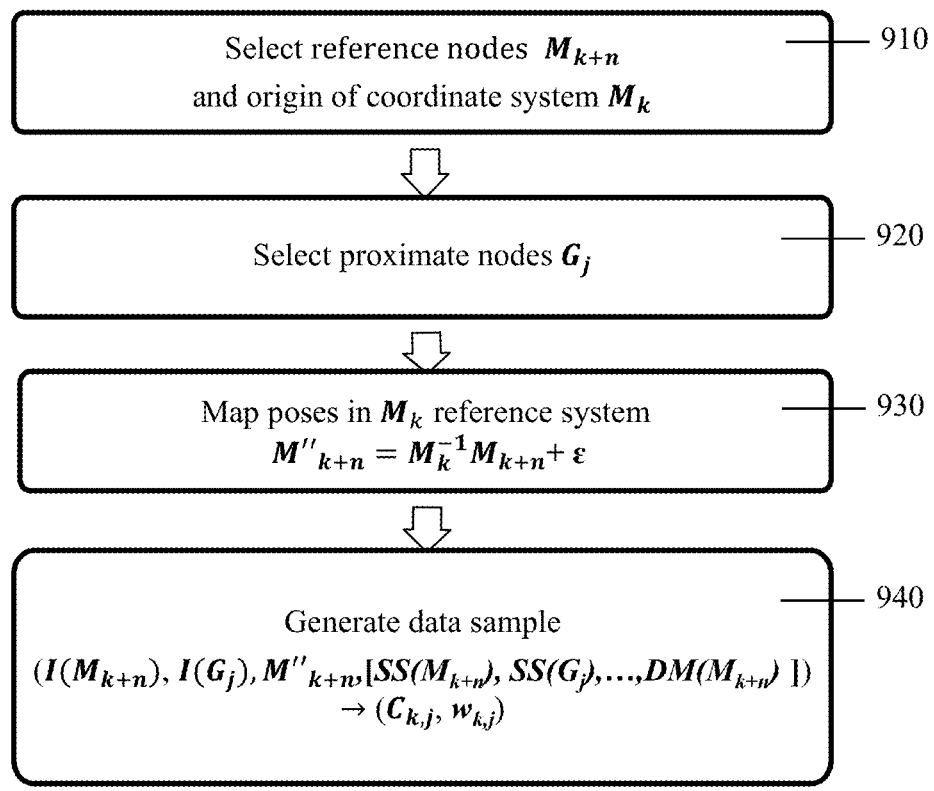
FIG. 9 is a simplified flowchart of a method for introducing error into a data sample, according to an exemplary embodiment of the present disclosure.

Reference is now made to FIG. 9, which is a simplified flowchart of a method for introducing error into a data sample, according to an exemplary embodiment of the disclosure. In the embodiment of FIG. 9, the data sample is for multiple reference nodes and multiple proximate nodes with SS and DM information, according to embodiments of the disclosure.

In 910, multiple reference nodes, $M_{k+n}$, are selected and one of the reference nodes, $M_k$, is selected as the origin of the coordinate system.

In 920, proximate nodes $G_j$ are selected.

In 930, the poses of the reference nodes are transformed with error ε to the $M_k$ coordinate system, $M''_{k+n} = M_k^{-1} M_{k+n} + \varepsilon$.

In 940, a data sample is built for $M''_{k+n}$ and $G_j$ by assigning the respective poses $C_{k,j}$. In the example of FIG. 9, the data sample includes SS and DM information, and the data sample is $(I(M_{k+n}), I(G_j), M''_{k+n}, \ldots, [SS(M_{k+n}), SS(G_j), \ldots, DM(M_{k+n})]) \rightarrow (C_{k,j})$. Other data samples may be built for the same images without SS and/or DM information and/or confidence values.

In an additional example, the SS and DM information is not available, confidence values are available and the data sample is:

$$(I(M_{k+n}), I(G_j), M''_{k+n}) \rightarrow (C_{k,j}, w_{k,j})$$

D. Localization with the Trained Neural Network

Figure 10:
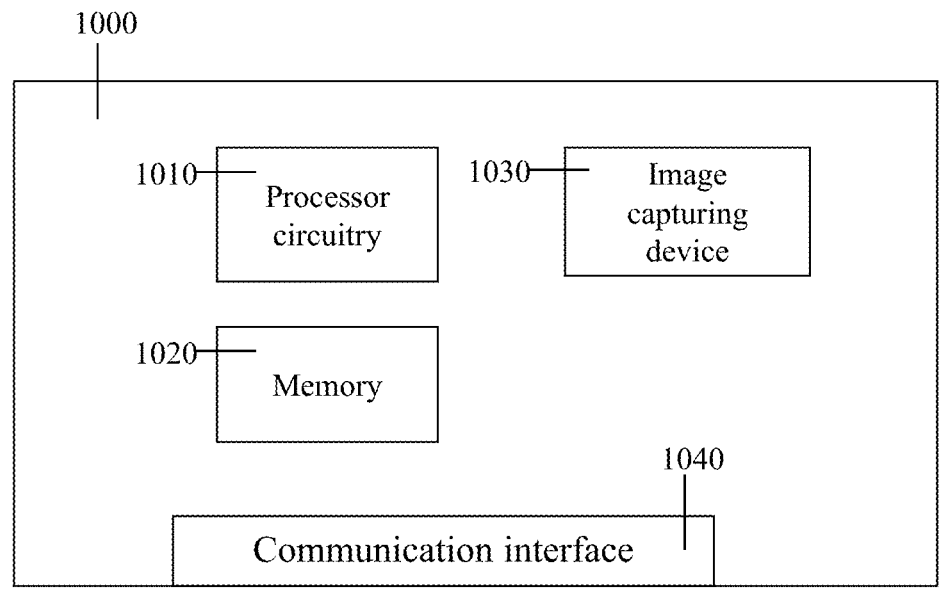
FIG. 10 is a simplified block diagram of an apparatus for image-based localization of a system in an area of interest, according to embodiments of the present disclosure.

Reference is now made to FIG. 10, which is a simplified block diagram of an apparatus for image-based localization of a system in an area of interest, according to embodiments of the disclosure. Localization is performed using a neural network which has been trained to perform pose estimation for a localization image using stored images that were captured during the mapping (denoted map images) and their respective poses.

Optionally, the trained neural network is one of:
1) A deep neural network (DNN);
2) A convolutional neural network (CNN);
3) A recurrent neural network (RNN); and
4) A Long short-term memory (LSTM) neural network.

Apparatus 1000 includes processor circuitry 1010 and memory 1020. Optionally, apparatus 1000 further includes one or more of:
a) Image capturing device 1030; and
b) Communication interface 1040.

Processor circuitry 1010 performs processing operations for performing the localization.

Memory 1020 stores images that were captured at multiple locations in an area of interest during mapping and the respective poses of the stored images. As described above, the pose of an image is the location and orientation of the image capturing device which captured the stored image at the time of image capture.

Apparatus 1000 obtains a localization image that was captured by an image capturing device. Optionally, apparatus 1000 includes image capturing device 1030 which captures the localization images. Alternately, the localization image is obtained from an external image capturing device.

To perform localization, a subset of the stored map images is retrieved from memory 1020. Information is provided to the trained neural network in order to obtain a pose estimate for the localization image. The information includes:
a) The localization image;
b) The retrieved images; and
c) The respective poses of the retrieved images.

Based on this input, the neural network outputs at least one pose estimate for the localization image (denoted a localization pose estimate).

Optionally, further input to the trained neural network includes: semantic segmentation information computed for at least one of the images and/or depth map(s) computed for at least one of the images.

Optionally, the subset of stored images retrieved from memory 1020 is selected based on the approximate location of the system being localized. Further optionally, the subset includes some or all of the stored images that were captured within a certain distance from the approximate location of the system.

The approximate location of the system being localized may be determined, for example, using a simple GPS device which provides a low accuracy estimate of the location and/or by place recognition and/or based on previous localization pose estimates.

Optionally, one or more of the retrieved images is selected as a reference image.

The output of the neural network is at least one localization pose estimate, which is expressed relative to a reference node coordinate system and/or relative to the map coordinate system.

Optionally, the neural network outputs a single localization pose estimate which is expressed relative to the pose of a single reference image.

Alternately or additionally, the neural network outputs multiple localization pose estimates. Each localization pose estimate is expressed relative to the pose of a different reference image. A final localization pose estimate is calculated from the multiple pose estimates.

Optionally, the neural network is trained to jointly estimate poses for multiple localization images, for example consecutive localization images. Joint estimation of multiple localization poses reduces error, as the neural network may be trained to ensure that vehicle dynamics constraints are satisfied (e.g. maximum vehicle speed is not exceeded in consecutive pose estimates).

Figure 11:
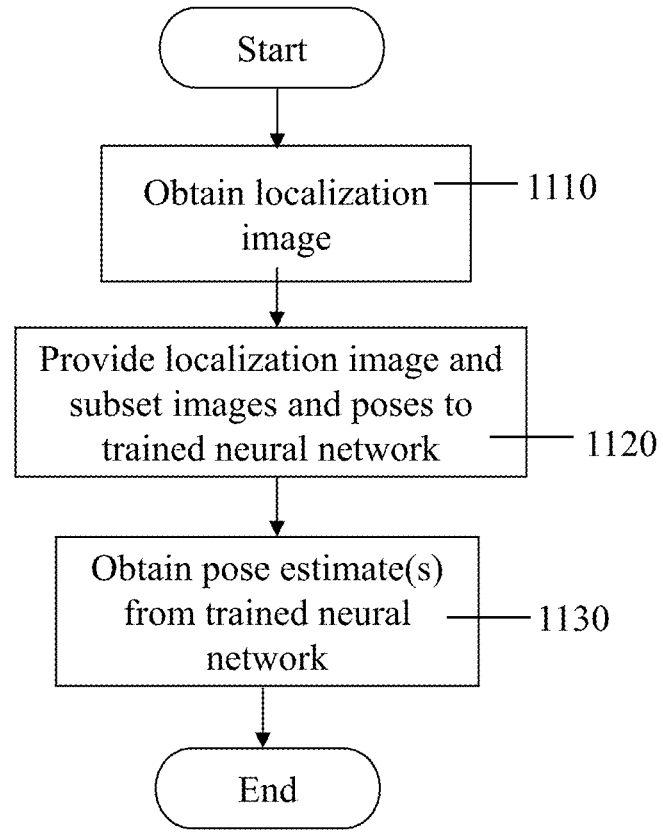
FIG. 11 is a simplified flowchart of a method for image-based localization of a system in an area of interest, according to embodiments of the present disclosure.

Reference is now made to FIG. 11, which is a simplified flowchart of a method for image-based localization of a system in an area of interest, according to embodiments of the disclosure.

In 1110, the localization image is obtained from an image capturing device.

In 1120, input data is provided to a trained neural network. The input data includes:
a) The localization image;
b) A subset of images selected from the stored images; and
c) Respective poses of the subset of images.

In 1130, at least one pose estimate is obtained from the trained neural network.

D.1 Single Reference Node

Figure 12:
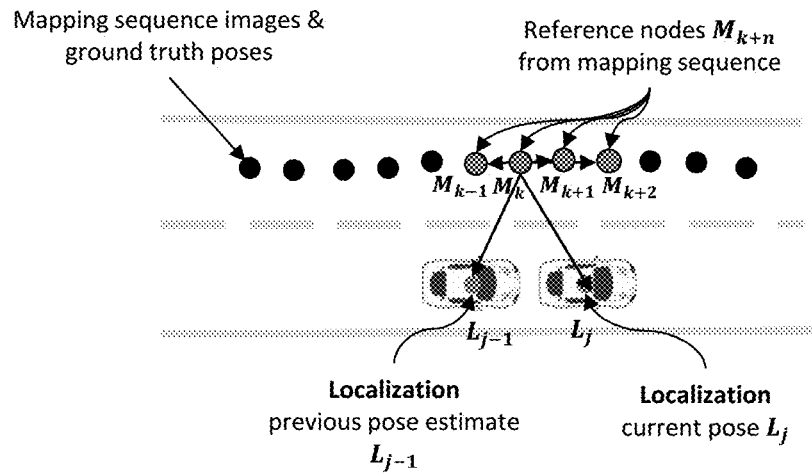
FIG. 12 illustrates pose estimation of a localization pose relative to a single reference node according to an exemplary embodiment of the present disclosure.

Reference is now made to FIG. 12, which illustrates pose estimation of a localization pose, $L_j$, relative to a single reference node $M_k$, according to an exemplary embodiment of the disclosure.

In order to estimate localization pose $L_j$, respective images and poses of multiple mapped pose nodes, $M_{k+n}$, are retrieved from memory. One of the pose nodes, in this example $M_k$, is selected as a reference node. All poses are expressed relative to the $M_k$ coordinate system, thereby bounding the pose estimate values within a limited range.

Optionally, reference node $M_k$ is the pose node closest to the approximate location of the system. Further optionally, the pose node closest to the localization pose is found by computing the relative poses of $M_{k+n}$ with respect to the localization image, and choosing the n having the smallest distance from the localization pose.

Optionally, the other pose nodes, $M_{k-1}$, $M_{k+1}$ and $M_{k+2}$, are proximate to $M_k$, for example within a specified distance from $M_k$.

Optionally, multiple localization poses ( . . . , $L_{j-3}$, $L_{j-2}$, $L_{j-1}$, $L_j$ . . . ) are estimated jointly, where $C_{k,j}$ is the pose estimate for localization image $I(L_j)$ relative to reference node $M_k$.

Figure 13:
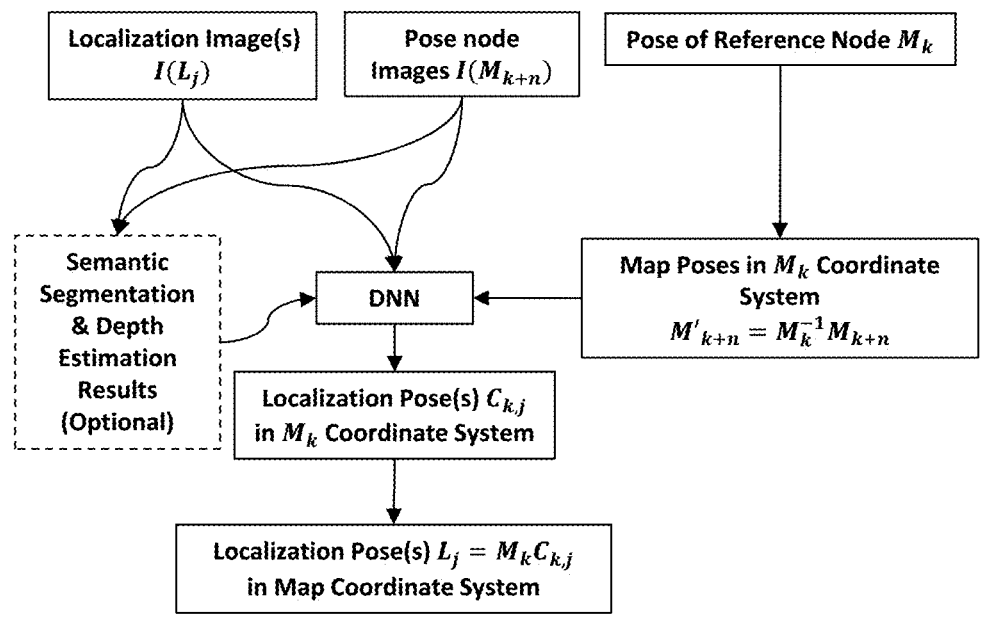
FIG. 13 shows the inputs and outputs of the trained neural network in accordance with the exemplary embodiment of FIG. 12.

Reference is now made to FIG. 13, which shows the inputs and outputs of the trained neural network in accordance with the exemplary embodiment of FIG. 12. Inputs to neural network DNN include:
 a) Pose node images $I(M_{k+n})$;
 b) Respective poses for pose node images relative to $M_k$, $M'_{k+n}$;
 c) Localization image, $I(L_j)$ (or localization images if multiple localization poses are being estimated jointly); and
 d) Optionally—semantic segmentation and/or depth map information.

The output of neural network DNN is the localization pose estimate $C_{k,j}$ in the $M_k$ coordinate system, which is transformed into the map-relative pose $L_j$.

D.2 Multiple Reference Nodes

Figure 14:
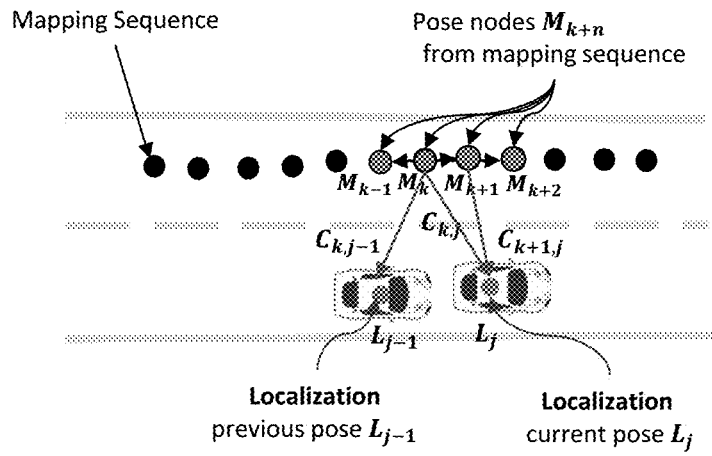
FIG. 14 illustrates pose estimation of a localization pose relative to multiple reference nodes.

Reference is now made to FIG. 14, which illustrates pose estimation relative to multiple reference nodes, according to an exemplary embodiment of the disclosure. Using multiple reference nodes reduces estimation error by providing more information to the neural network.

In order to estimate localization pose $L_j$, respective images and poses of multiple reference nodes, $M_{k+m}$, are selected. Images and pose information for reference nodes $M_{k+m}$ are retrieved from memory. The neural network calculates multiple pose estimates for each localization image, where each pose estimate is relative to a different reference node. The multiple pose estimates are combined to form the final pose estimate $L_j$. For example $L_j$ may be computed as the weighted average of the multiple pose estimates, where the weights are the confidence values $w_{k,j}$.

Optionally, multiple localization poses, . . . , $L_{j-3}$, $L_{j-2}$, $L_{j-1}$, $L_j$, are estimated jointly, where $C_{k,j}$ is the pose estimate for localization image $I(L_j)$ relative to reference node $M_k$.

Figure 15:
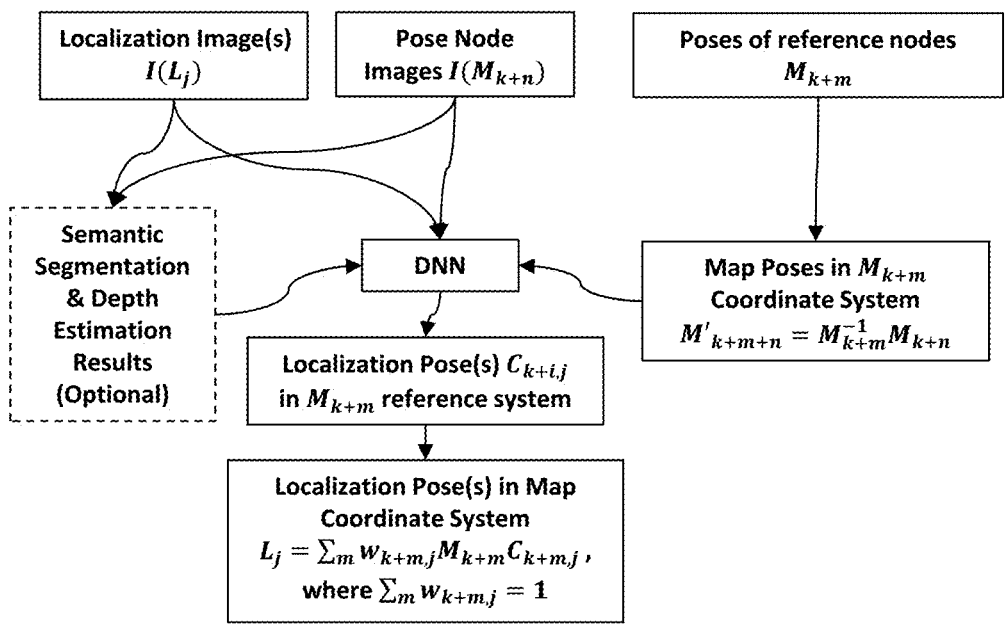
FIG. 15 shows the inputs and outputs of the trained neural network in accordance with the exemplary embodiment of FIG. 14.

Reference is now made to FIG. 15, which shows the inputs and outputs of the trained neural network in accordance with the exemplary embodiment of FIG. 14. Inputs to neural network DNN include:
 a) Images of pose nodes $M_{k+n}$, $I(M_{k+n})$;
 b) Poses for pose nodes $M_{k+n}$ relative to multiple reference nodes, $M'_{k+n+m}$;
 c) Localization image, $I(L_j)$ (or localization images if multiple localization poses are being estimated jointly); and
 d) Optionally—semantic segmentation and/or depth map information.

The outputs of neural network DNN are multiple pose estimates ($C_{k+i,j}$) for each localization image, $I(L_j)$, in the $M_{k+m}$ coordinate system. A weighted average is calculated for the multiple pose estimates to obtain a single map-relative localization pose estimate: $L_j = \Sigma_m \omega_{k+m,j} M_{k+m} C_{k+m,j}$, where $\Sigma_m \omega_{k+m,j} = 1$.

D.3 Estimation Accuracy Measure

Optionally, an estimation accuracy measure is provided for a pose estimate. The estimation accuracy measure is based on a comparison of the difference between ground truth pose estimates obtained for the same localization image for different reference nodes to the actual ground truth pose difference for those reference nodes (which is known from the map).

Figure 16:
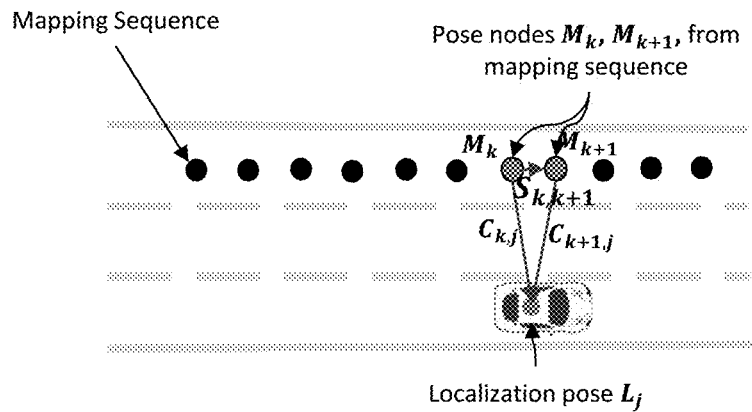
FIG. 16 illustrates different estimates obtained for a single localization pose.

Reference is now made to FIG. 16, which illustrates how different estimates are obtained for a single localization pose, $L_j$. $C_{k,j}$ is the pose estimate for localization image $I(L_j)$ when $M_k$ is used as the reference node, and $C_{k+1,j}$ is the pose estimate for localization image $I(L_j)$ when $M_{k+1}$ is used as the reference node.

Figure 17:
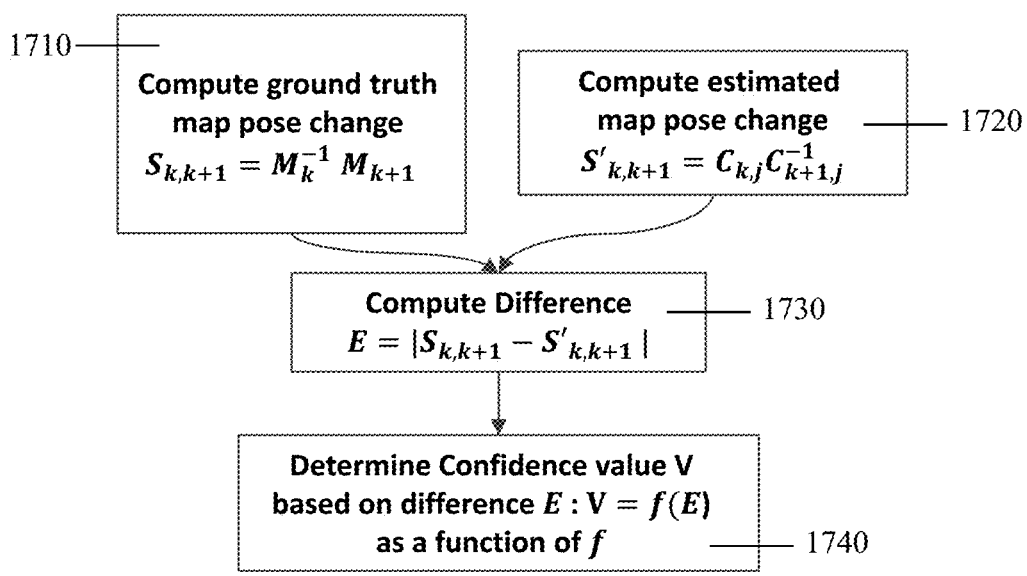
FIG. 17 is a simplified flowchart of a method for determining an estimation accuracy measure for a pose estimate, according to embodiments of the present disclosure.

Reference is now made to FIG. 17, which is a simplified flowchart of a method for determining an estimation accuracy measure for a pose estimate, according to embodiments of the disclosure.

In 1710, the change in the ground truth pose of nodes $M_k$ and $M_{k+1}$ is calculated as:

$$S_{k,k+1} = M_k^{-1} M_{k+1}.$$

In 1720, the change in the ground truth pose estimates for $L_j$ is calculated as:

$$S'_{k,k+1} = C_{k,j} C_{k+1,j}^{-1}.$$

In 1730, the difference is calculated as: $E = |S_{k,k+1} - S'_{k,k+1}|$

In 1740, a confidence value V is calculated from the difference E, where V is a measure of the accuracy of the pose estimate.

The methods as described above are used in the fabrication of integrated circuit chips.

The flowchart and block diagrams in the Figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is expected that during the life of a patent maturing from this application many relevant neural networks, neural network training techniques, types of images, image capturing devices, pose sensors and memories will be developed and the scope of the terms neural network, trained neural network, images, image capturing device, pose sensor and memory are intended to include all such new technologies a priori.

The terms "comprises", "comprising", "includes", "including", "having" and their conjugates mean "including but not limited to". This term encompasses the terms "consisting of" and "consisting essentially of".

The phrase "consisting essentially of" means that the composition or method may include additional ingredients and/or steps, but only if the additional ingredients and/or steps do not materially alter the basic and novel characteristics of the claimed composition or method.

As used herein, the singular form "a", "an" and "the" include plural references unless the context clearly dictates otherwise. For example, the term "a compound" or "at least one compound" may include a plurality of compounds, including mixtures thereof.

The word "exemplary" is used herein to mean "serving as an example, instance or illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment of the disclosure may include a plurality of "optional" features unless such features conflict.

Throughout this disclosure, various embodiments may be presented in a range format. It should be understood that the description in range format is merely for convenience and brevity and should not be construed as an inflexible limitation on the scope of the disclosure. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of the disclosure, which are, for clarity, described in the context of separate embodiments, may also be provided in combination in a single embodiment. Conversely, various features of the disclosure, which are, for brevity, described in the context of a single embodiment, may also be provided separately or in any suitable subcombination or as suitable in any other described embodiment of the disclosure. Certain features described in the context of various embodiments are not to be considered essential features of those embodiments, unless the embodiment is inoperative without those elements.

Although the disclosure has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present disclosure. To the extent that section headings are used, they should not be construed as necessarily limiting.

What is claimed is:

1. An apparatus for generating a model for pose estimation of a system, the apparatus comprising a processor circuitry, the processor circuitry being configured to:
    obtain training data for a plurality of locations, the training data comprising a number of captured images captured by an image capturing device, and a respective number of poses of the captured images, wherein a respective pose, of the respective poses of the image capturing device, associated with a respective captured image, of the captured images, comprises a respective location, of the locations, and an orientation of the image capturing device during capture of the captured image;
    generate from the training data at least one data sample for each of the captured images, wherein the at least one data sample for the respective captured image comprises an assignment of the respective captured image and at least one other image selected from the training data to the corresponding respective poses;
    train a neural network with a data set comprising the at least one data sample to estimate a respective pose of a localization image from:
        the localization image;
        at least one additional image from the training data;
        the respective pose of the at least one additional image; and
    calculate an estimation accuracy measure by comparing a pose change between a plurality of estimated poses for the localization image to at least one pose change between reference images used for calculating the plurality of estimated poses.

2. The apparatus according to claim 1, wherein the generating the at least one data sample comprises:
    selecting at least one reference image from the training data;
    selecting at least one proximate image having a pose proximate to a pose of the at least one reference image from the training data; and
    assigning the at least one reference image and the at least one proximate image to respective poses of each proximate image relative to each reference image.

3. The apparatus according to claim 2, wherein the at least one reference image comprises a single reference image and the assigning designates the respective poses of each proximate image relative to the single reference image.

4. The apparatus according to claim 2, wherein the at least one reference image comprises a plurality of reference images and the assigning designates respective poses of each proximate image relative to each of the reference images.

5. The apparatus according to claim 2, wherein respective poses of the at least one proximate image are within a specified distance from a pose of at least one of the reference images.

6. The apparatus according to claim 1, wherein the processor circuitry is further configured to introduce an error into the training data by changing at least one pose in the data samples prior to the training.

7. The apparatus according to claim 1, wherein the processor circuitry is further configured to track errors in estimation of the poses during the training, and to calculate respective confidence values for poses estimated by the neural network based on the tracked errors.

8. The apparatus according to claim 1, wherein at least one of the data samples further comprises a semantic segmentation computed for at least one image mapped in the data set.

9. The apparatus according to claim 1, wherein at least one of the data samples further comprises a depth map computed for at least one image mapped in the data set.

10. The apparatus according to claim 1, wherein the neural network comprises a deep neural network (DNN).

11. A method for generating a neural network for pose estimation of a system, the method comprising:
    obtaining training data for a plurality of locations, the training data comprising a number of captured images captured by an image capturing device, and a respective number of poses of the captured images, wherein a respective pose, of the respective poses of the image capturing device, associated with a respective captured image, of the captured images, comprises a respective location, of the locations, and an orientation of the image capturing device during capture of the captured image;
    generating from the training data at least one data sample for each of the captured images, wherein the at least one data sample for the respective captured image comprises an assignment of said the respective captured image and at least one other image selected from the training data to the corresponding respective poses;
    training a neural network with a data set comprising the at least one data sample to estimate a respective pose of a localization image from:
    the localization image;
    at least one additional image from the training data; and
    a respective pose of each of the at least one additional image; and
    calculating an estimation accuracy measure by comparing a pose change between a plurality of estimated poses for the localization image to at least one pose change between reference images used for calculating the plurality of estimated poses.

12. The method according to claim 11, wherein, for at least one of the data samples, the assignment comprises:
    selecting a single reference image from the training data;
    selecting at least one proximate image selected training data based on proximity to the reference image; and
    designating respective poses of the at least one proximate image relative to the single reference image.

13. The method according to claim 11, wherein, for at least one of the data samples, the assignment comprises:
    selecting a plurality of reference images selected from the training data;
    selecting at least one proximate image from the training data based on proximity to the reference images; and
    designating respective poses of each proximate image relative to each reference image.

14. The method according to claim 11, further comprising introducing an error into the training data by changing at least one pose in the data samples prior to the training.

15. The method according to claim 11, further comprising tracking errors in estimation of the poses during the training, and calculating a respective confidence value for poses estimated by the neural network based on the tracking.

16. An apparatus for image-based localization of a system in an area of interest, comprising:
    a memory configured to store images captured by an image capturing device of the system at a plurality of locations in the area of interest, and respective poses of the image capturing device associated with the stored images at each of the locations, wherein a pose, of the respective poses, of a respective image, of the stored images, comprises a location, of the locations, and an orientation of the capturing device associated with the respective image; and
    a processor circuitry configured to:
    obtain a localization image captured by the image capturing device;
    retrieve from the memory a subset of the stored images and the respective poses;
    provide to a trained neural network:
    the localization image;
    the retrieved images; and
    the respective poses of the retrieved images; and
    obtain from the trained neural network at least one estimated pose for the localization image; and
    calculate an estimation accuracy measure by comparing a pose change between a plurality of estimated poses for the localization image to at least one pose change between reference images used for calculating the plurality of estimated poses.

17. The apparatus according to claim 16, wherein the processor circuitry is further configured to:
    determine an approximate location of the image capturing device during the capturing of the localization image; and
    select the subset of stored images based on the approximate location.

18. The apparatus according to claim 16, wherein the neural network outputs a single estimated pose relative to a pose of a single reference image selected from the retrieved images.

19. The apparatus according to claim 16, wherein the neural network outputs the plurality of estimated poses, each of the estimated poses being relative to a pose of a different reference image selected from the retrieved images, and wherein the processor circuitry is further configured to calculate a final estimated pose from the plurality of estimated poses.

20. The apparatus according to claim 16, wherein the trained neural network comprises a deep neural network (DNN).

21. The apparatus according to claim 16, wherein the trained neural network is further provided with a semantic segmentation computed for at least one of the images provided to the trained neural network.

22. The apparatus according to claim 16, wherein the trained neural network is further provided with a depth map computed for at least one of the images provided to the trained neural network.

23. A method for image-based localization of a system in an area of interest, comprising:

obtaining a localization image captured by an image capturing device of the system;
providing to a trained neural network:
  the localization image;
  a subset of images selected from a plurality of images captured during a mapping of the area of interest; and
  respective poses associated with the subset of images, wherein a pose, of the poses, of an image, of the images, comprises a location and an orientation associated with the image capturing device when capturing the image;
obtaining from the trained neural network at least one estimate of a pose of the localization image; and
calculate an estimation accuracy measure by comparing a pose change between a plurality of estimated poses for the localization image to at least one pose change between reference images used for calculating the plurality of estimated poses.

24. The method according to claim 23, wherein the subset of images is selected based on a proximity to an estimated location of the localization image.

25. The method according to claim 23, wherein the neural network outputs a single estimated pose relative to a pose of a single reference image selected from the subset of images.

26. The method according to claim 25, further comprising obtaining an approximate location of the image capturing device from a satellite navigation system, the reference image being selected based on the approximate location.

27. The method according to claim 23, wherein the neural network outputs the plurality of estimated poses, each of the estimated poses being relative to a pose of a different reference image selected from the subset of images, further comprising calculating a final estimated pose from the plurality of estimated poses.

28. The method according to claim 23, wherein the trained neural network comprises a deep neural network (DNN).

* * * * *